US009531497B2

(12) United States Patent
Shishkin et al.

(10) Patent No.: US 9,531,497 B2
(45) Date of Patent: Dec. 27, 2016

(54) REAL-TIME AND PROTOCOL-AWARE REACTIVE JAMMING IN WIRELESS NETWORKS

(71) Applicant: Drexel University, Philadelphia, PA (US)

(72) Inventors: Boris Shishkin, Philadelphia, PA (US); Danh H. Nguyen, Philadelphia, PA (US); Cem Sahin, Philadelphia, PA (US); Kapil R. Dandekar, Philadelphia, PA (US); Nagarajan Kandasamy, Philadelphia, PA (US); David J. Dorsey, Wilmington, DE (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/290,545

(22) Filed: May 29, 2014

(65) Prior Publication Data

US 2016/0344510 A1 Nov. 24, 2016

Related U.S. Application Data

(60) Provisional application No. 61/828,394, filed on May 29, 2013.

(51) Int. Cl.
*H04B 17/00* (2015.01)
*H04K 3/00* (2006.01)

(52) U.S. Cl.
CPC ............. *H04K 3/80* (2013.01); *H04K 2203/10* (2013.01)

(58) Field of Classification Search
CPC .............. H04K 3/32; H04K 3/43; H04K 3/45; H04K 3/46; H04K 2203/18
(Continued)

(56) References Cited

U.S. PATENT DOCUMENTS 7,986,922 B2 * 7/2011 Glazko et al. ................ 455/100
8,543,053 B1 * 9/2013 Melamed et al. ................ 455/1
(Continued)

OTHER PUBLICATIONS

"The USRP Hardware Driver (UHD)", (http://ettusapps.sourcerepo.com/redmine/ettus/projects/uhd/wiki), Copyright 2006-2012.
(Continued)

*Primary Examiner* — Simon Nguyen
(74) *Attorney, Agent, or Firm* — Baker & Hostetler LLP

(57) ABSTRACT

A real-time capable, protocol-aware, reactive jammer using GNU Radio and the USRP N210 software-defined radio (SDR) platform detects in-flight packets of known wireless standards and reacts to jam them—within 80 ns of detecting the signal. A reactive jamming device is achieved using low-cost, readily available hardware. The real-time reactive jamming device includes a real-time signal detector that detects an event in received packets in the wireless network, a reactive jamming device that sends a triggering signal when the event is detected, and a jamming generator responsive to the triggering signal to generate a jamming signal that has a user-defined delay so as to enable jamming of specific locations in received packets in the wireless network. The effects of three types of jamming on WiFi (802.11g) and mobile WiMAX (802.16e) networks are demonstrated and jamming performances are quantified by measuring the network throughput using the iperf software tool.

20 Claims, 12 Drawing Sheets

(58) Field of Classification Search
USPC ............................ 455/1, 67.11, 67.13, 456.4
See application file for complete search history.

(56) References Cited

U.S. PATENT DOCUMENTS

| | | | | |
|---|---|---|---|---|
| 8,958,437 | B1 * | 2/2015 | Salhotra et al. | 370/445 |
| 2002/0136183 | A1 * | 9/2002 | Chen et al. | 370/338 |
| 2004/0239559 | A1 * | 12/2004 | King et al. | 342/357.12 |
| 2005/0041728 | A1 * | 2/2005 | Karlsson | 375/219 |
| 2006/0038677 | A1 * | 2/2006 | Diener et al. | 340/540 |
| 2006/0140251 | A1 * | 6/2006 | Brown et al. | 375/135 |
| 2009/0156116 | A1 * | 6/2009 | Sheby et al. | 455/1 |
| 2009/0325478 | A1 * | 12/2009 | Sun et al. | 455/1 |
| 2010/0245151 | A1 * | 9/2010 | Muthali et al. | 342/19 |
| 2011/0086590 | A1 * | 4/2011 | Johnson et al. | 455/1 |
| 2011/0183602 | A1 * | 7/2011 | Tietz | 455/1 |
| 2012/0051239 | A1 * | 3/2012 | Thai | 370/252 |
| 2014/0018059 | A1 * | 1/2014 | Noonan | 455/419 |
| 2014/0038536 | A1 * | 2/2014 | Welnick et al. | 455/154.1 |
| 2014/0038541 | A1 * | 2/2014 | Reiss | 455/296 |
| 2014/0347978 | A1 * | 11/2014 | Kim et al. | 370/225 |

OTHER PUBLICATIONS

Bayraktaroglu, et al, "On the Performance of IEEE 802.11 under Jamming," in Proc. of INFOCOM 2008, Apr. 2008, vol. 0448330,1265-1273.

Gollakota et al, "iJam: Jamming Oneself for Secure Wireless Communication," Technical report, MIT, 2010.

Gollakota et al, "Physical layer wireless security made fast and channel independent," In Proc. of IEEE INFOCOM 2011, Apr. 2011, 1125-1133.

Li, I. Koutsopoulos, et al, "Optimal Jamming Attacks and Network Defense Policies in Wireless Sensor Networks," In Proc. of IEEE INFOCOM 2007, 1307-1315.

Prasad et al, "Jamming attacks in 802.11g—A cognitive radio based approach," In Proc. of IEEE MILCOM 2011, Nov. 2011, pp. 1219-1224.

Shen et al, "Ally Friendly Jamming: How to Jam Your Enemy and Maintain Your Own Wireless Connectivity at the Same Time," In Proc. of IEEE Symposium on Security and Privacy, May 2013, 174-188.

Wilhelm et al, "Reactive Jamming in Wireless Networks—How Realistic is the Threat?," In Proc. of ACM WiSec, 2011, 47-52.

* cited by examiner

REAL-TIME AND PROTOCOL-AWARE REACTIVE JAMMING IN WIRELESS NETWORKS

CROSS-REFERENCE TO RELATED APPLICATIONS

The present application claims priority to U.S. Provisional Patent Application No. 61/828,394, filed May 29, 2013. The contents of that application are hereby incorporated by reference.

GOVERNMENT RIGHTS

The subject matter disclosed herein was made with government support under grant numbers CNS 1228847, ECS 1028608, CNS 0854946, and CNS 0923003 awarded by the National Science Foundation. The Government has certain rights in the herein disclosed subject matter.

TECHNICAL FIELD

The present invention relates to wireless networks and, more particularly, to systems and methods for reactive adversarial jamming of such networks.

BACKGROUND

Due to its inherent broadcast nature, the wireless medium suffers security vulnerabilities that do not exist in wired networking. Recent research in wireless communications has strongly emphasized securing the physical layer against external security threats. One such security threat is the Denial-of-Service (DoS) attack at the physical layer, wherein the adversary transmits interfering signals, e.g. jamming signals, to make the wireless network become unavailable to legitimate users.

In its most basic form, a DoS attack can be just a continuous in-band jamming signal with sufficient power to corrupt all transmitted packets. A continuous jammer is simple to implement but suffers from two disadvantages: high power requirement for jamming operations and high probability of detection. Reactive jammers, on the other hand, are more efficient due to their ability to sense the wireless medium and to jam packets that are already in the air. By jamming packets reactively at critical moments, adversaries can significantly reduce network throughput using little energy while minimizing the chances of being detected. This type of jamming is much more efficient, as short bursts of jamming can still destroy the entire packet. In addition, reactive jamming is challenging to detect because the adversary creates limited interference with other nodes in the network, and the jamming signals only exist during the same duration as the packet.

Several categories of jammers have been identified in the literature based on their awareness of channel conditions and statefulness (e.g., E. Bayraktaroglu, C. King, X. Liu, G. Noubir, R. Rajaraman, and B. Thapa, "On the Performance of IEEE 802.11 under Jamming," in *Proc. of INFOCOM* 2008, vol. 0448330, April 2008, pp. 1265-1273). Among them, reactive jammers are the most sophisticated due to their ability to "sense" the wireless medium and jam packets that are already in the air. The ability to be aware of channel conditions is highly desirable in adversarial jamming, as it can enable a wide range of sophisticated attacks. However, reactive jammers have not received much attention as a security threat in practice, mainly because of the implementation challenges in meeting strict real-time constraints in detecting and reacting to in-flight packets of high speed wireless networks.

Considerable prior research exists to characterize the effects of selective adversarial jamming to several wireless protocols. The problem of reactive jamming, in particular, has been studied from both the viewpoint of a jammer to devise optimal jamming strategies (M. Li, I. Koutsopoulos, and R. Poovendran, "Optimal Jamming Attacks and Network Defense Policies in Wireless Sensor Networks," *In Proc. of IEEE INFOCOM* 2007, pages 1307-1315; S. Prasad and D. J. Thuente, "Jamming attacks in 802.11g—A cognitive radio based approach," *In Proc. of IEEE MILCOM* 2011, pages 1219-1224, November 2011), and from the viewpoint of a wireless network to achieve jamming-resilient communications. Recently, the possibility of using self-jamming and cooperative jamming as a way to create secure wireless networks has also been considered. Gollakota and Katabi disclose in S. Gollakota and D. Katabi, "iJam: Jamming Oneself for Secure Wireless Communication," Technical report, MIT, 2010; and S. Gollakota and D. Katabi, "Physical layer wireless security made fast and channel independent," *In Proc. of IEEE INFOCOM* 2011, pages 1125-1133, April 2011) a data secrecy scheme called iJam wherein randomized self-jamming signals are used to deny potential eavesdroppers access to the raw signal data. Similarly, Shen et al. in "Ally Friendly Jamming How to Jam Your Enemy and Maintain Your Own Wireless Connectivity at the Same Time," In Proc. of IEEE Symposium on Security and Privacy, pages 174-188, May 2013, develop a method to jam the wireless channel continuously while properly controlling the jamming signals with secret keys such that these signals interfere in an unpredictable fashion with unauthorized devices but are recoverable by authorized ones equipped with the secret keys.

While a majority of the above-mentioned research focuses on theoretical analysis and simulations, researchers still lack a practical way to deploy experimental protocols and evaluate their performances in typical high-speed wireless environments. The difficulties of achieving synchronization with real-time signals and timely RF responses are outlined and echoed throughout many prior art publications. For example, the iJam protocol was experimentally demonstrated using USRP radios; however, the transmitter must purposely introduce dummy paddings at the end of the PHY header, before the useful data, to account for the decoding and jamming response delays at the receiver. Applicants are aware of only a single study, by Wilhelm et al. in "Reactive Jamming in Wireless Networks—How Realistic is the Threat?," In Proc. of ACM WiSec, pages 47-52, 2011, describing the performance of reactive jamming using software-defined radios (SDRs) on standard-compliant networks in real time. Wilhelm et al. demonstrate a hardware implementation of reactive jammers capable of operating in low-rate, Zigbee-based 802.15.4 networks. Hardware implemented reactive systems have a significant advantage over conventional SDR systems which utilize host side processing in that hardware implementations allow very short latency responses.

A need remains for a real-time, channel-aware, reactive jamming platform to permit the study of inherent vulnerabilities of wireless networks to eavesdropping and jamming attacks without requiring decoding at the receiver on a fully hardware implemented but host controlled platform. A need also remains for a reactive jamming platform with significantly faster RF response time for signal detection and response as well as additional degrees of freedom for performing live wireless security experiments with a variety of high-speed wireless standards. The present invention addresses these needs in the art.

SUMMARY

The invention addresses the above-mentioned and other needs in the art by providing a real-time, protocol-aware, reactive jamming platform for wireless networks based on GNU Radio (gnuradio.org) and the USRP N210 software defined radio (SDR) platform. The inventors demonstrate that reactive jammers can be realized using readily available, COTS SDR hardware, but nonetheless can achieve the necessary performance to reliably and selectively jam in-flight packets of WiFi (802.11 a/b/g) and WiMAX (802.16e) networks. The invention establishes that software-defined reactive jammers should be considered as a serious wireless security threat.

An FPGA platform is described that may be used to demonstrate the threats of reactive jamming to cause severe network disruption of conventional WiFi (802.11 a/b/g) and WiMAX (802.16e) networks. The disclosed platform is low-cost, operates across multiple standards, and provides real-time FPGA implemented full-duplex operation, including signal detection with fast turnaround times in response to RF triggers that permit threats to be readily classified and reacted to. The system further provides flexible detection systems, flexible antenna implementations, frequency hopping capabilities, and simultaneous dual band operation. The system also maintains all of the functional capabilities of the GNU Radio implementation and will work with existing source code for communication and security applications. The added functionally does not inhibit any functions of the system that are integral to communication. In other words, not only is this a hardware implemented PHY layer for jamming, signal intelligence and electronic countermeasures, but is also an invaluable tool for improving computer radio applications on the SDR. The disclosed implementation is also largely protocol agnostic.

The system described herein provides an intelligent jammer that can avoid detection, selectively jam specific targets, work in low power mode, and perform heuristic analysis on channel occupancy and channel states of opponents. Those skilled in the art will appreciate that the intelligent jammer described herein is a research tool and is most useful for protocol design and electronic countermeasures (ECM) testing.

In exemplary embodiments, a real-time reactive jamming device and associated method is provided for jamming signal transmissions in a wireless network. Such a jamming device includes a real-time signal detector that detects an event in received packets in the wireless network, a reactive jamming device that sends a triggering signal when the event is detected, and a jamming generator responsive to the triggering signal to generate a jamming signal that has a user-defined delay so as to enable jamming of specific locations in received packets in the wireless network. In exemplary embodiments, the real-time signal detector comprises a hardware cross-correlator that enables run-time loading of user-defined cross-correlation coefficients from host applications that receive the packets in the wireless network. The real-time signal detector may further include an energy differentiator that operates separately or in parallel with the hardware cross-correlator to provide detection triggers based on a difference in received signal energy levels over a predetermined time interval that is user modifiable at run-time. For example, the user modifiable signal energy levels difference may be set for an energy change of 3 dB to 30 dB for positive (increasing) and/or negative (decreasing) energy changes.

In the exemplary embodiments, the reactive jamming device includes a three-stage hardware state machine that performs RF trigger filtering and provides an RF response based on a series of conditional parameters that are changeable in response to RF detection triggers or in response to a control algorithm. In response, the jamming generator, once triggered, generates at least one of three user-selectable jamming waveforms: (i) a wideband noise jammer such as a pseudorandom 25 MHz White Gaussian Noise (WGN) signal, (ii) a receiver replay system that, for example, provides repetitive replay of a predetermined number (e.g., up to 512) most recently received samples, or (iii) a transmitter of a user-defined waveform currently being streamed from a host application. The duration of generation of the jamming signal is customizable and ranges from 1 sample time up to at least $2^{32}$ sample times. In exemplary embodiments, the jamming generator generates a jamming signal in approximately 80 ns from the receipt of the triggering signal.

BRIEF DESCRIPTION OF THE DRAWINGS

The foregoing and other beneficial features and advantages of the invention will become apparent from the following detailed description in connection with the attached figures, of which.

DETAILED DESCRIPTION OF ILLUSTRATIVE EMBODIMENTS

Figure 1:
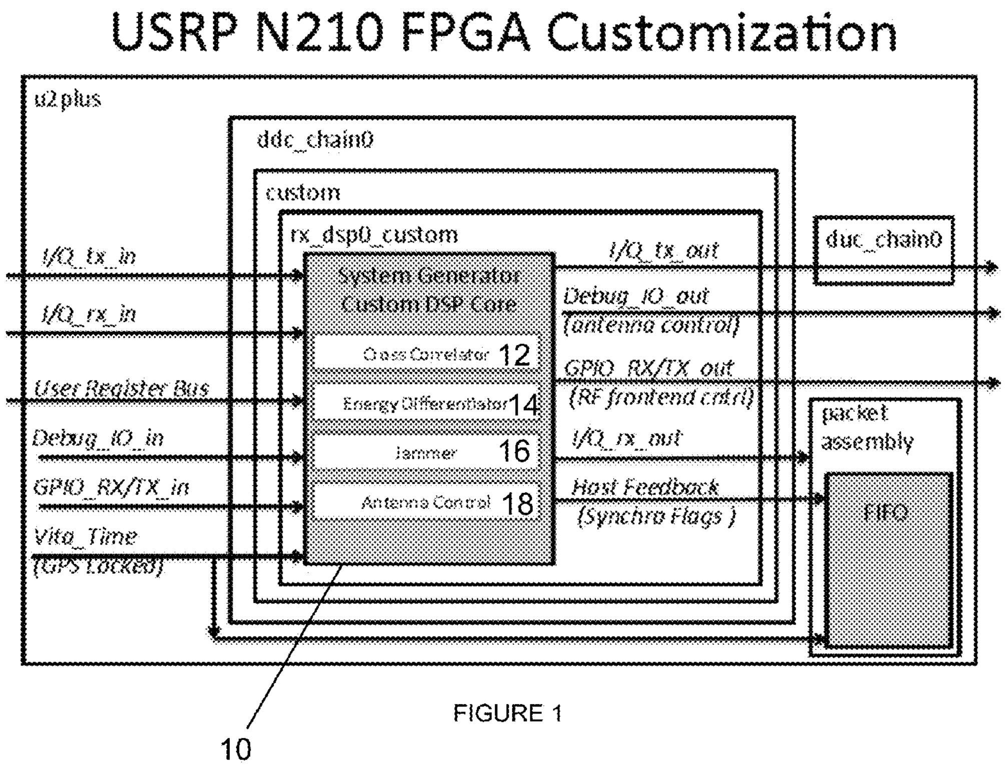
FIG. 1 illustrates a high level overview of a custom Internet Protocol (IP) implementation of a software development platform (SDR) using the USRP N210 field programmable gate array (FPGA).

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and software for implementing such methods.

A detailed description of illustrative embodiments of the present invention will now be described with reference to FIGS. 1-12. Although this description provides a detailed example of possible implementations of the present invention, it should be noted that these details are intended to be exemplary and in no way delimit the scope of the invention.

FPGA Implemented System Architecture

The invention is directed to a real-time, reactive system that can be programmed to operate with a wide variety of signaling standards and to provide fast turnaround time between signal detection and over-the-air response. To achieve the most flexible experimental system, the inventors aim to minimize detection time and reduce transmission delay to a minimum.

The USRP N210 SDR and the GNU Radio framework provide a low cost, open source, starting point for development. The platform is capable of full-duplex transmission and supports several front-ends including a flexible SBX radio card. SBX is an agile transceiver board that provides up to 40 MHz of instantaneous RF bandwidth and tunable center frequency between 400 MHz and 4 GHz. This flexibility allows reactive jamming experiments with a variety of high-speed wireless standards to be conducted. To minimize switching time between receive (RX) and transmit (TX) operations during jamming, the inventors initialize both TX and RX chains simultaneously in the host application during start-up. All time-sensitive functions, such as packet detection, trigger filtering, and transmit-to-jam operations are implemented in the FPGA hardware, with only a few high-level controls provided to host. This implementation effectively bypasses host side interactions and even the soft processor (ZPU) on the USRP during signal processing. A custom DSP core takes complete control of the transmit data path and produce jamming waveforms based on several application presets. A wide variety of detection standards and settings and selectable jamming response parameters, such as jammer uptime, gain, delay, and waveforms, are dynamically accessible and can be changed on the fly from the host application.

To increase the platform flexibility, the inventors target a hardware system that works with the highest sampling rate available on the USRP platform. As such, the hardware design is built to work with a USRP baseband sampling rate of 25 Msps and a hardware clock of 100 MHz.

A. Hardware Implementation

The Universal Hardware Driver (UHD) (http://ettus-apps.sourcerepo.com/redmine/ettus/projects/uhd/wiki) for the USRP N210 allows for the customization of DSP operations at multiple critical locations in the digital down-conversion chain (DDC). The core of the design, a hardware block that acts as a custom packet detector and a jamming controller, is nested within the DDC chain and inside the custom DSP module wrapper provided by UHD. As shown in FIG. 1, the USRP N210 FPGA includes a system generator custom DSP core 10 for an exemplary reactive jammer including cross-correlator 12, energy differentiator 14, jammer 16, and antenna control 18. This custom DSP module wrapper contains a predefined user-interface bus that provides unidirectional control of the custom DSP core 10 and is directly accessible from the host side application API. Samples of the received baseband signal, after down-conversion, decimation, and filtering, are passed through this custom DSP core 10 for user-defined operations, including signal detection and jamming triggers as explained below.

Figure 2:
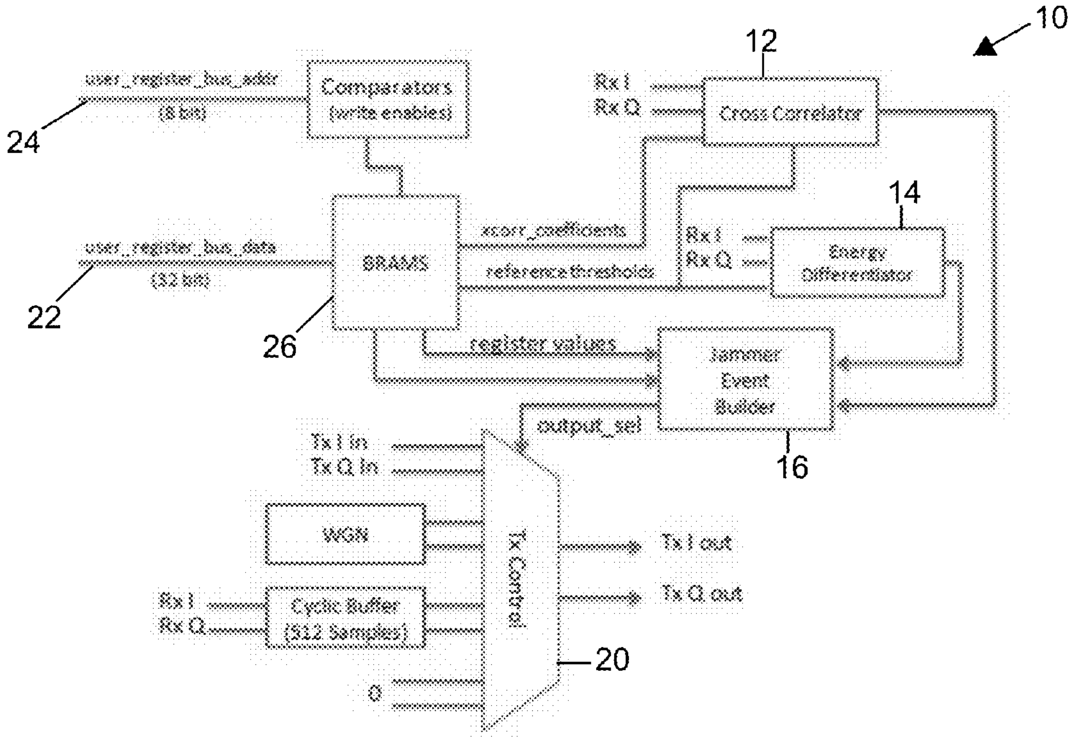
FIG. 2 illustrates a hardware block diagram of an exemplary reactive jammer in accordance with an embodiment of the invention.

FIG. 2 shows the high-level architecture of the custom DSP core 10, including four main functional blocks: a cross-correlator 12 for matched filtering, an energy differentiator 14 for energy rise and fall detections, a jamming event builder (jamming detector) 16, and a transmit controller (jamming generator) 20. Details on each of these functional blocks are provided below. In addition to these main blocks, the custom DSP core 10 also has a number of smaller logic blocks responsible for internal timing synchronization and control of external I/Os. I and Q samples of the received RF signal, after down-conversion, decimation, and filtering, are passed through this custom DSP core 10 to carry out user-defined operations, including signal detection and jamming triggers. The custom DSP core 10 is implemented in an exemplary embodiment using Xilinx System Generator (version 14.2), a plugin for Matlab Simulink that allows HDL generation directly from block-level diagrams.

FIG. 2 shows the internal architecture of the custom DSP core, together with the primary I/O signals routed from higher levels of the UHD hardware implementation. As illustrated in FIG. 2, the host-side control path for the custom DSP core 10 is enabled through the user register bus in the UHD design. This user register bus contains a 32-bit data bus 22 and an 8-bit address bus 24, together providing up to 255 programmable 32-bit registers in the user's custom DSP core 10. The gr-uhd component of GNU Radio provides the necessary APIs to interact with this user register bus and program the custom user registers to control the custom DSP core 10. The exemplary design makes use of 24 of these user registers to enable run-time updates of cross-correlator coefficients and detection thresholds from BRAMS 16, jammer settings, and antenna control signals from host applications.

B. Hardware Signal Detection

The signal detection system is designed to ensure successful and accurate jamming in real time while minimizing the occurrences of false reactions and retaining system flexibility. First, signal detection processing is moved from the host onto the USRP N210's FPGA. This allows for high-speed detector designs and deterministic timing in operations. Second, in the custom DSP core 10, the signal cross-correlator 12 and energy differentiator 14 operate in parallel to realize fast and accurate real-time signal detection. The cross-correlator 12 performs template-based detection and enables the platform to react to only packets of a single wireless standard. The energy detector 14 performs coarse-grained detection to detect any wireless activity on a particular band of interest. The signal detection hardware also provides a control path for customization of detection logic at run-time.

Figure 3:
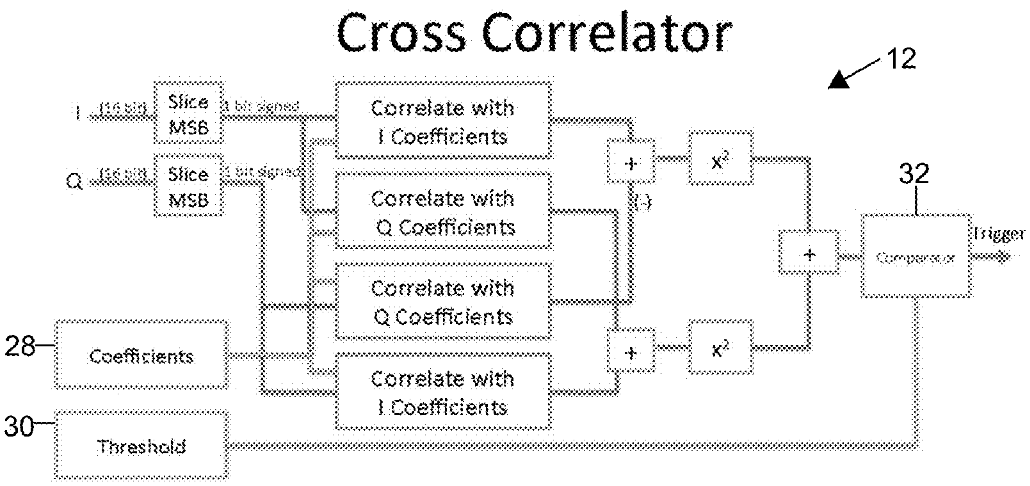
FIG. 3 illustrates a block diagram of an exemplary cross-correlator on the block diagram of FIG. 2.

A block diagram of an exemplary signal cross-correlator 12 is illustrated in FIG. 3. For synchronization and fine-grained signal detection, the inventors extract and make use of the cross-correlation DSP core from Rice University WARP's OFDM Reference Design version 15 as cross-correlator 12. This hardware core implements a 64-sample weighted phase correlator, with 90° phase resolution, using the sign bits from each pair of incoming I and Q samples. The structure of an exemplary embodiment of the cross-correlation DSP core, with added custom logic, is shown in FIG. 3. In the design illustrated in FIG. 3, incoming base-band samples (top left) are correlated against a template of 64 3-bit signed cross-correlation coefficients 28 for both I and Q signals. These coefficients are generated offline on the host based on knowledge of the wireless standards' preambles or inferred from the low-entropy portions of the samples of incoming signals. The result of this process is a confidence-weighted phase correlator output that is then compared against a user-selected threshold 30 at comparator 32 for a detection decision. In addition, the inventors also modify the cross-correlation core to enable run-time loading of user-defined correlation coefficients from host-side applications through the user register bus provided by UHD. This allows full customization of signal detection as long as the host application knows the preset preamble values or is able to detect some low-entropy portions of the received signal.

Figure 4:
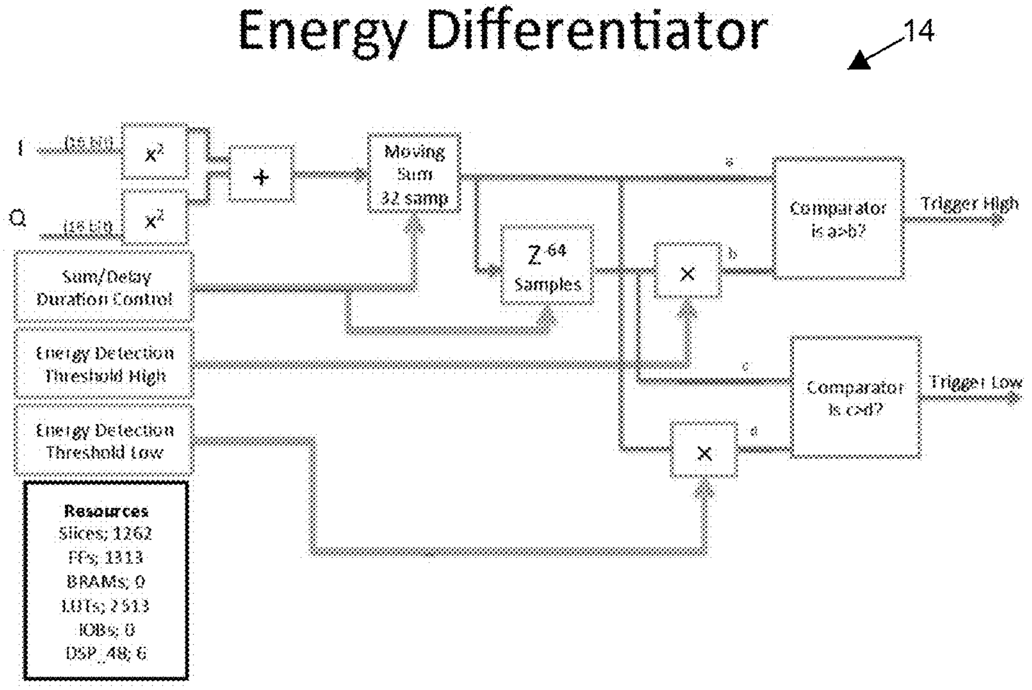
FIG. 4 illustrates a block diagram of an exemplary energy differentiator on the block diagram of FIG. 2.

FIG. 4 illustrates a block diagram of an exemplary energy differentiator 14 on the block diagram of FIG. 2. The secondary detection method is an energy differentiator 14, shown in FIG. 4, which continuously compares the energy level of incoming samples against the recent past to detect an energy rise or fall. In essence, this hardware block keeps a running sum of N recent energy readings, where N is the desired length of the differentiator (32 samples in the exemplary embodiment). At the nth instant, an energy reading x[n] is computed from the incoming pair of I and Q values. The energy sum y[n] is then updated according to the relationship:

$$y[n]=y[n-1]+x[n]-x[n-N], \text{ for } n\geq N.$$

The output of the energy sum calculator is compared to its own previous values after scaling by user-defined thresholds either for energy high or energy low detection. Users can set detection for any energy level change between 3 dB and 30 dB, and for both positive (increasing) and negative (decreasing) energy changes. This energy differentiation provides the channel occupancy status if no cross-correlation coefficients are available.

C. Real Time System Response

In exemplary embodiments, reactive jamming capabilities are achieved through triggering jamming operations immediately following detection events. In an initial implementation, a three-stage hardware state machine allows the user to select up to three trigger event combinations, all of which must occur within a user-assigned time interval. Once triggered, jamming operations will take place using one of three user-selectable waveforms: (i) a pseudorandom 25 MHz White Gaussian Noise (WGN) signal, (ii) a repetitive replay of up to 512 most recently received samples, or (iii) the waveform currently being streamed to the transmit buffer from the host. The duration of jamming is also customizable and can range from 1 sample time (40 ns) up to $2^{32}$ sample time (about 40 s). A user-defined delay option between detection triggers is also provided to enable jamming of specific locations in the packets.

Since all detection and reaction functions are implemented in FPGA hardware, the turnaround time between detection triggering and jamming response is extremely short. An RF jamming response can be initiated within 1 clock cycle of detection trigger, with approximately seven more cycles required to populate the digital up-conversion chain (DUC) with jamming waveforms. With a 100 MHz hardware clock of the USRP N210 platform, over-the-air packets within 80 ns of signal detection may be detected and jammed Practically, the turnaround time for the system is limited by the time required to populate the detectors. In the case of the energy differentiator 14, the response time (from detection to jam) is at most 1.36 s, and is contingent upon the triggering threshold, as well as the signal ramp-up time and the received signal power. In the case of the cross-correlator 12, the maximum response time is approximately 2.64 μs and is contingent upon whether the detection coefficients are unique or cyclic across the 64 correlation samples. As a practical example, an 802.11g frame and its jamming response were captured by an Agilent 54855 DSO with a measured delay of 1.24 μs using a 20 dB energy differentiation trigger at received signal power of 34 dBm and noise floor at −90 dBm.

D. Host Side Interface

The inventors implemented a Python-based custom GUI to configure the jammer operations on the fly, using GNU Radio Companion with additional custom code. This GUI acts as a reactive jamming event builder 16, where the user can specifically control detection types and desired jamming reactions during run-time. The user inputs are passed directly to the UHD driver stack, which uses pre-defined functions to set all RF as well as operations of custom DSP core 10. The GUI application is a useful tool for demonstration purposes, and can be easily modified to provide an interface for more powerful host side processing applications, thereby enabling complete, autonomous jamming operations.

Detection Performance

A. Jamming Timelines

Figure 5:
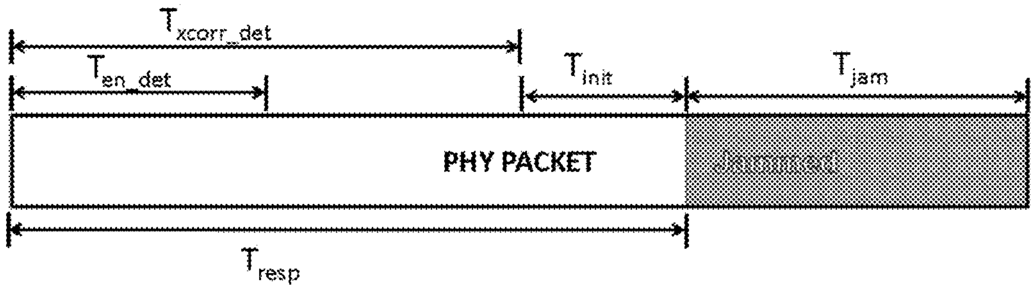
FIG. 5 illustrates an example where an 802.11g packet is jammed before the first OFDM symbol is successfully received over the air.

To get an impression of the platform's reactive jamming capabilities, the timeliness of various detection and jamming operations are estimated based on their latency in terms of hardware cycles. FIG. 5 shows the reactive jamming timelines. FIG. 5 denotes the minimum time for the system to detect an energy high (or low), corresponding to an active transmission, as $T_{en\_det}$, the time for cross-correlation detection as $T_{xcorr\_der}$, the time to schedule and initialize the TX pipeline for jamming as $T_{ini}$, and the jamming duration as $T_{jam}$. The system response time, denoted as $T_{resp}$, is the combined time for both detection and jamming triggers. The following observations can be made with respect to FIG. 5:

An energy (or low) detection takes at most 32 baseband samples, or 128 clock cycles, to trigger. This duration can be shorter if the threshold is set low (at the cost of higher false alarm rates). Since the hardware clock is 100 MHz, $T_{en\ det}$<1.28 μs.

The cross-correlator hardware performs a 64-sample phase correlation. With a good preamble design, it takes exactly 64 samples from the start of transmission to trigger a cross-correlation detection. At 25 MSPS, this means $T_{xcorr\ det}$=2.56 μs.

Once a detection triggers, it takes about 8 clock cycles to initialize the transmit chain and to start jamming, so $T_{init}$≈80 ns. The system response time is therefore less than 1.36 μs if using energy detection, and 2.64 μs using cross-correlation detection.

The jamming duration ($T_{jam}$) is selectable between 40 ns and 40 s by the users. In general, a short but sufficient jamming burst is desired. Jamming can also be initialized after a custom delay to target specific portions of the packet. This type of "surgical" jamming is highly destructive due to its ability to target critical information contained in a wireless PHY packet, such as channel estimation.

In comparison, each 802.11g WiFi packet contains 10 short preambles (8 μs duration), 2 long preambles (8 μs duration), PHY parameters (4 μs) and a variable length Physical Layer Service Data Unit (PSDU). With a system response time of at most 2.56 μs, an 802.11g packet can be jammed before the first OFDM data symbol is received.

B. Signal Detection

The signal detection performance of the platform is characterized in a WiFi transmission scheme. In one experiment, the cross-correlator 12 is set up to detect two types of WiFi preambles: short preambles consisting of 16 samples in length, and long preambles consisting of 64 samples in length. To test the robustness of this cross-correlator 12, a second USRP N210 is used as the transmitter for use in generating two types of frames for testing: complete WiFi frames with 10 short preambles, 2 long preambles, the SIGNAL symbol, and the payload, as well as pseudo-frames with only a single short or long preamble. The characterization is performed in a wired link to isolate environmental effects and to provide independently measured SNR values at the receiver.

Figure 6:
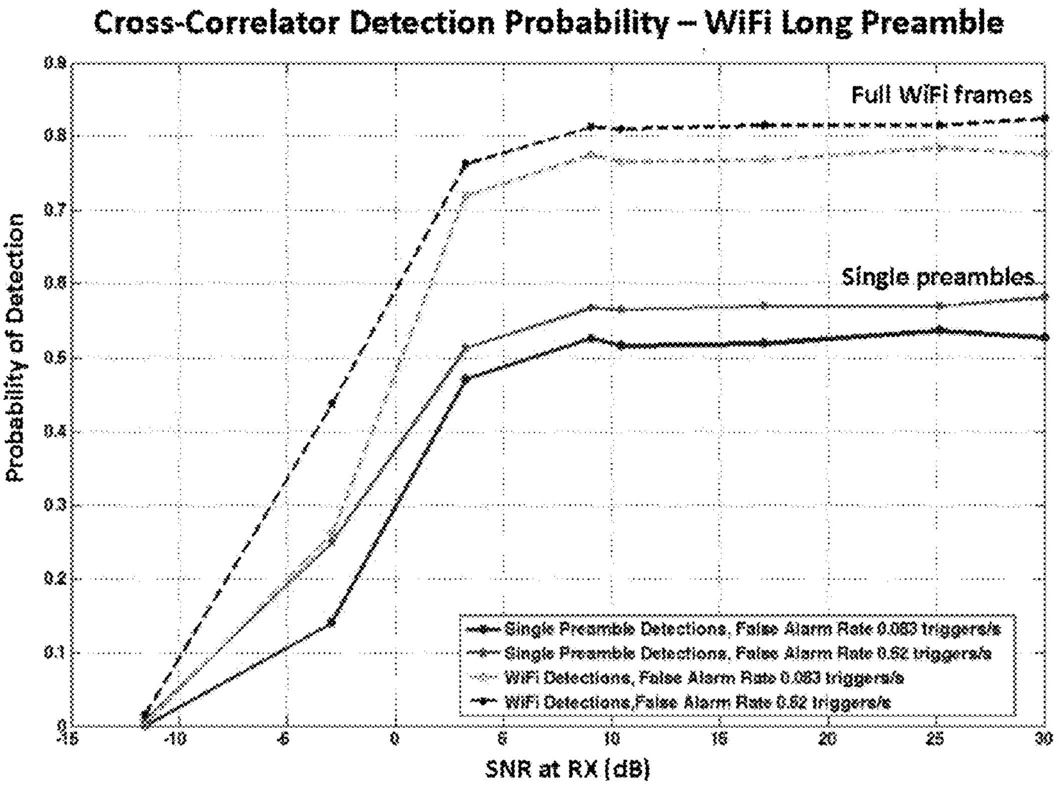
FIG. 6 illustrates cross-correlation based detection of WiFi long preamble for packets with a single long preamble as well as full WiFi frames.

To get the characteristic false alarm rates for a particular correlation threshold, the receiver is terminated with a 500 terminator and the number of false triggers are counted that occur in 30 minutes. For probability of detection, 10000 WiFi frames (or pseudo frames) are generated and sent, at 130 frames per second, and the number of detections is counted. FIG. 6 shows the detection results of long WiFi preambles under two false alarm rates, 0.083 and 0.52 triggers/sec. FIG. 6 illustrates that using a lower correlation detection threshold, i.e., aiming for a lower false alarm rate, generally decreases the probability of detection. For detection of a single long WiFi preamble, the detection rate increases with higher SNR and is slightly above 50% for SNR over 5 dB, which is rather low for a 64-sample correlator.

The efficiency of the cross-correlator 12 depends on a number of parameters, including the sampling rate mismatch between the cross-correlator 12 and the RF signal, the dynamic range characteristics of the signal being correlated, and the quantization of both the phase and amplitude of the correlation coefficients. In this case, the sampling rate mismatch between the transmitter and receiver causes a highly suboptimal operating condition for the cross-correlator 12. On the transmit side, the WiFi long preamble is generated assuming a sampling rate of 20 MSPS according to the 802.11g standard (64 samples within a period of 3.2 μs FFT integration time). On the receive side, the correlation window also consists of 64 samples, but at a sampling rate of 25 MSPS based on the UHD hardware design. As a result, an orthogonal code that is 3.2 μs long is being correlated across its first 2.56 μs, yielding significantly low detection performance. It will be appreciated that increasing the correlation size above 64 samples will undoubtedly improve the single-preamble detection performance, but will also give rise to higher resource utilization, lower speed, and potential timing issues.

FIG. 6 also shows that the probability of detection becomes better if multiple copies of the same preamble are transmitted, as in the case of full WiFi frames. Since two long preambles are transmitted in each WiFi frame, the cross-correlator 12 yields significantly higher detection rates at over 75% for SNR above 5 dB.

Figure 7:
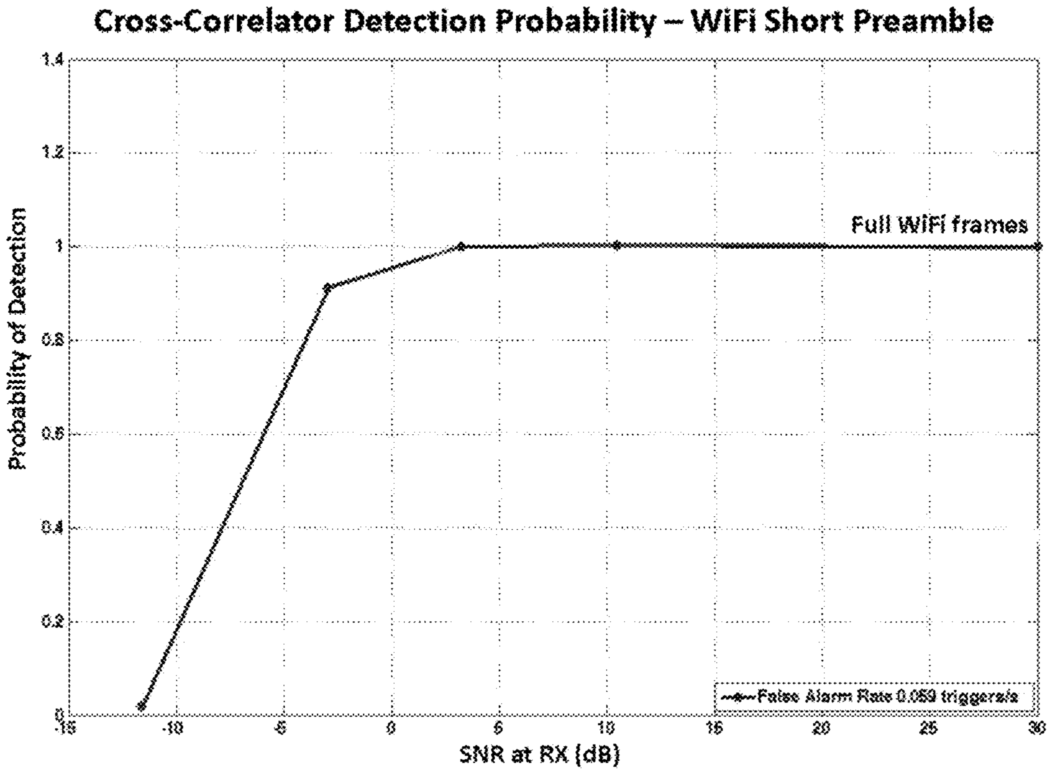
FIG. 7 illustrates cross-correlation based detection of full WiFi frames using short preambles.

For comparison, the inventors conducted the same test using full WiFi frames but set the cross-correlator 12 to detect only WiFi short preambles. Each short preamble consists of 16 samples at 20 MSPS, repeated for 10 times in a WiFi frame. The duration of the orthogonal code here is 0.8 μs with 10 cyclic repetitions, totaling 8 μs of short preamble time. The detection results, shown in FIG. 7, illustrate that the cross-correlator 12 is able to trigger on over 90% of the preambles at −3 dB SNR, and over 99% of the preambles at SNRs above 3 dB, with a constant false alarm rate of 0.059 detections per second.

Figure 8:
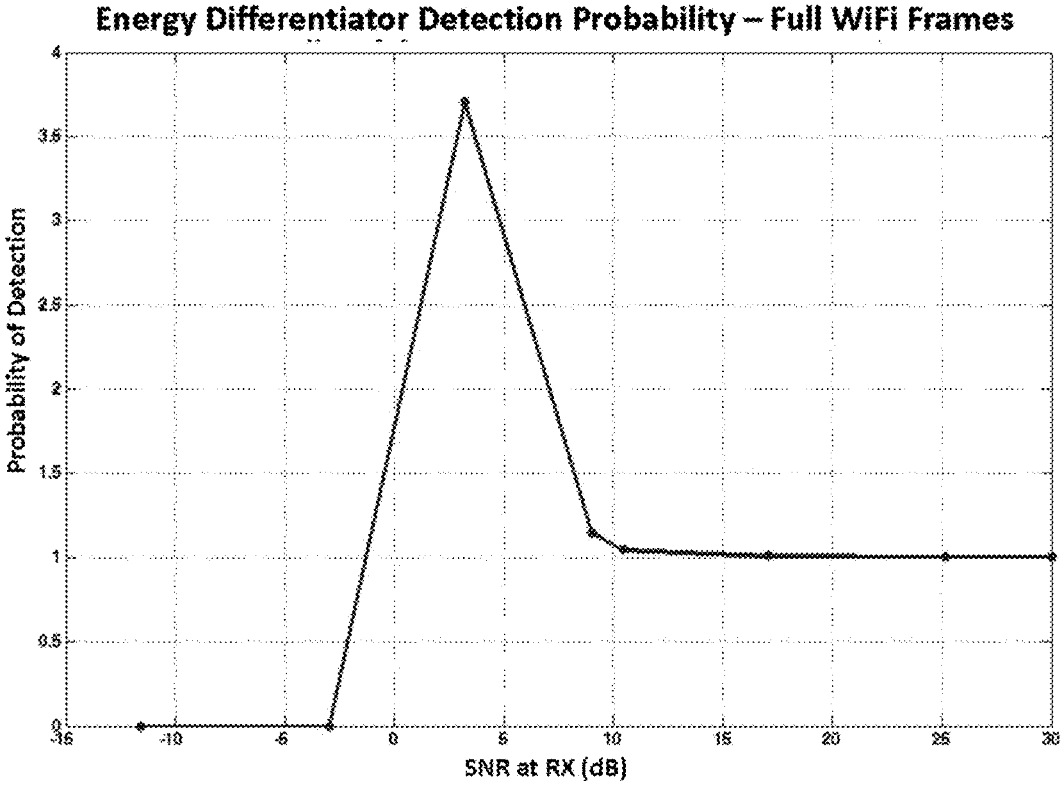
FIG. 8 illustrates the performance of the energy differentiator in terms of detection probability for full WiFi frames.

Using the same methodology, the inventors characterize the energy differentiator 14 detection performance by sending complete WiFi frames at 130 frames per second, for a total of 10,000 frames. The energy detection threshold is set to 10 dB, yielding a measured false alarm rate of 0 detections per second. FIG. 8 shows the energy high detection performance when the received SNR is increased gradually. For SNRs below −3 dB, the signal level is below the noise floor, and thus no detection occurs. When the SNR is between −3 dB and 8 dB, the signal level approaches the noise floor, and multiple energy high detections are recorded per frame. The excessive detections are caused by continuous dynamic range variations during the duration of the PHY frame, as a result of the superposition of OFDM signals and noise at roughly the same power levels. This effect fades as the SNR rises above the energy detection threshold, and the energy differentiator reliably produces a single detection per frame for SNRs above 10 dB.

These characterization results demonstrate the functional and efficient performance of the detection system within the described framework. Those skilled in the art will appreciate that multiple detection methods may be combined to create even more reliable detection mechanisms.

Validation on WiFi Networks

The inventors performed system tests to validate the platform's reactive jamming capabilities with real-time traffic in two different standards: WiFi 802.11g and mobile WiMAX 802.16e. The experimental results are presented below.

Experimental Setup

A. System Components

Figure 9:
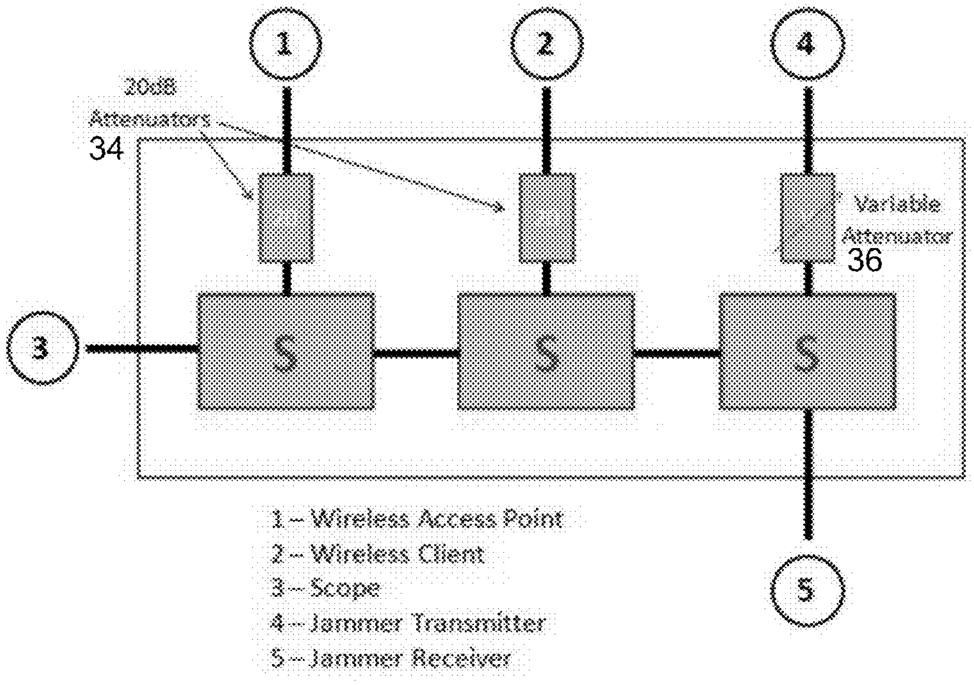
FIG. 9 illustrates an exemplary 5-port network showing connections to the exemplary system.

In order to test the effectiveness of the real-time reactive jammer in a non-disruptive controlled manner, the inventors set up a wired, 5-port interconnect network using power splitters as shown in FIG. 9. 20 dB attenuators 34 were placed on Ports 1 and 2 to emulate the path loss caused by wireless environments and to prevent receiver saturation. A variable attenuator 36 was added to Port 4 in order to provide a large dynamic range for the effects of the jammer on the network. The network was characterized using a vector network analyzer at the numbered ports, and port to port losses were recorded in Table I.

TABLE I

Insertion loss values measured at the ports of the 5-port network.

| | Output | | | | |
|---|---|---|---|---|---|
| Input | 1 | 2 | 3 | 4 | 5 |
| 1 | | −51.0 dB | −25.2 dB | −38.4 dB | −39.3 dB |
| 2 | −51.0 dB | | −31.7 dB | −32.0 dB | −32.8 dB |
| 3 | −25.2 dB | −31.7 dB | | −19.1 dB | −19.9 dB |
| 4 | −38.4 dB | −32.0 dB | −19.1 dB | | |
| 5 | −39.2 dB | −32.8 dB | −19.8 dB | | |

For this experimental setup, the inventors connected system components as shown in FIG. 9. A Linksys WRT54GL, programmed with custom firmware, acted as a wireless access point (AP) and was connected to port 1. The wireless client was placed at port 2. Ports 4 and 5 were dedicated to the jammer transmitter and receiver, respectively. All active system components were programmed to use the same WiFi channel and the same WiFi protocol: 802.11g. No other interference was observed in the channel. Finally, port 3 was connected to an oscilloscope in order to observe the signaling environment in the time domain.

B. Experimental Procedure

The access point (AP) was connected to a computer running connectivity tests along with throughput traffic tests using iperf server, a popular network bandwidth measurement tool at the application layer. An identical computer was also set up on the wireless client side in order to generate and characterize the wireless traffic (iperf client) between the two users. The inventors ran simple ping tests to ensure active network connection and delay. The main experiment was a detailed iperf UDP bandwidth test. The AP was designated as the iperf server, and the wireless client was configured to be the iperf client. UDP bandwidth tests with maximum bandwidth of 54 Mbps were conducted repeatedly for 60 second intervals between these two hosts under different jammer settings. To ensure simplicity and avoid upper-layer effects of TCP/IP stack, TCP connections were not characterized for this set of results. The 802.11g buffering parameters and rate back-offs were not constrained, and were considered inherent parts of the hardware limitations and 802.11 link characteristics, respectively.

A USRP N210 FPGA as described above in full-duplex operation was introduced into the system as the jamming entity. The jammer was connected to the 5-port network described in FIG. 9. The configurable jammer settings were controlled on the fly. The performance of the reactive jammer was measured and compared to the no jamming case results along with the continuous jamming case results.

C. WiFi Reactive Jamming Results

Experimental results for jamming effects in a WiFi (802.11g) and WiMAX (802.16) network are described below. Using the same hardware platform, three different types of jamming are characterized: a continuous jamming, reactive jamming with relatively long uptime after trigger (0.1 ms), and reactive jamming with short uptime after trigger (0.01 ms).

1. Bandwidth Under Jamming

Figure 10:
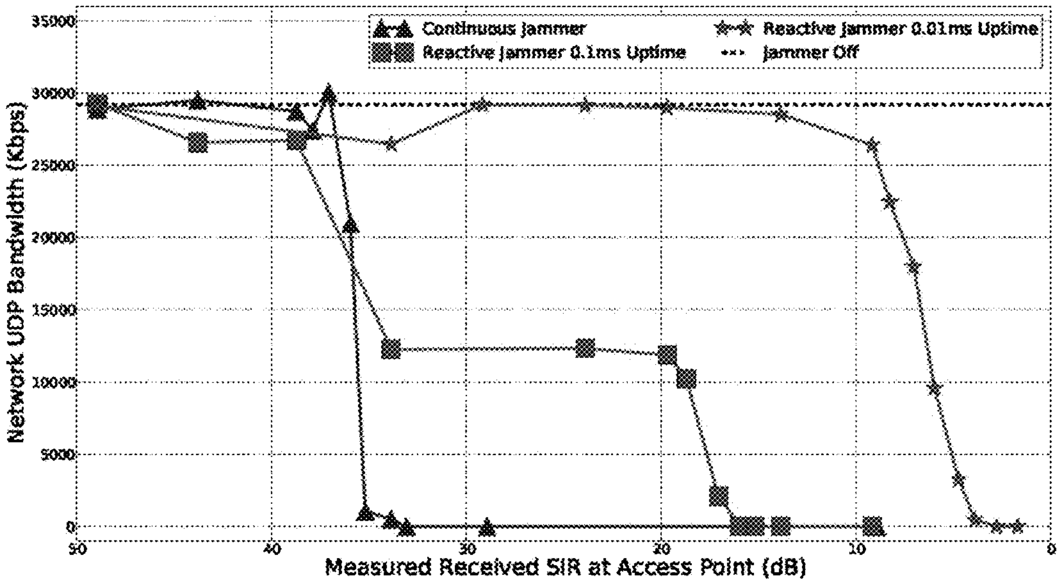
FIG. 10 illustrates the packet reception ratio as a result of an iperf 60-second WiFi UDP bandwidth test where jamming power increases from left to right.

The results from an iperf 60-second UDP bandwidth test is shown in FIG. 10. The achievable UDP bandwidth reported by iperf is plotted against the signal-to-interference power ratio (SIR) at the access point (AP). A wide SIR range was provided by controlling jammer TX power as well as through the use of stacked attenuators. Note that the SIR axis is arranged in descending order to illustrate the drop in system performance with increase in interference power.

While the maximum UDP bandwidth is defined at 54 Mbps for the iperf application, the maximum effective UDP bandwidth during application runs, with or without the jammer, was around 29 Mbps. This is due to overhead within the 802.11 standard, the TCP/IP stack, and additional data overhead of the iperf application itself. The dashed line in FIG. 10 represents maximum achievable bandwidth without the jammer. A continuous jammer, even at low jamming power, raised the system noise level and significantly reduced network bandwidth. At an SIR of 33.85 dB, the continuous jammer caused the wireless bandwidth to drop to 0 Kbps, and connection to the access point was lost.

Reactive jammers disrupt the wireless networks in a more subtle fashion, and thus are harder to detect. The SIR values presented here depict the channel conditions experienced by the AP during those brief moments when the jammer was actively transmitting. Throughout these experimental runs, the access point had no knowledge of the jammer's presence and always reported an "excellent" link condition. FIG. 10 illustrates that a reactive jammer with longer uptime after trigger tends to be more disruptive to the wireless network. The 0.1 ms uptime reactive jammer reduces the network bandwidth by half at an SIR of 33.85 dB, and completely shuts down the network at SIR 15.94 dB. The 0.01 ms uptime reactive jammer needs to transmit at a much higher power, yielding an SIR of 2.79 dB at AP, in order to shut down the wireless channel.

2. Packet Reception Ratio Under Jamming

Figure 11:
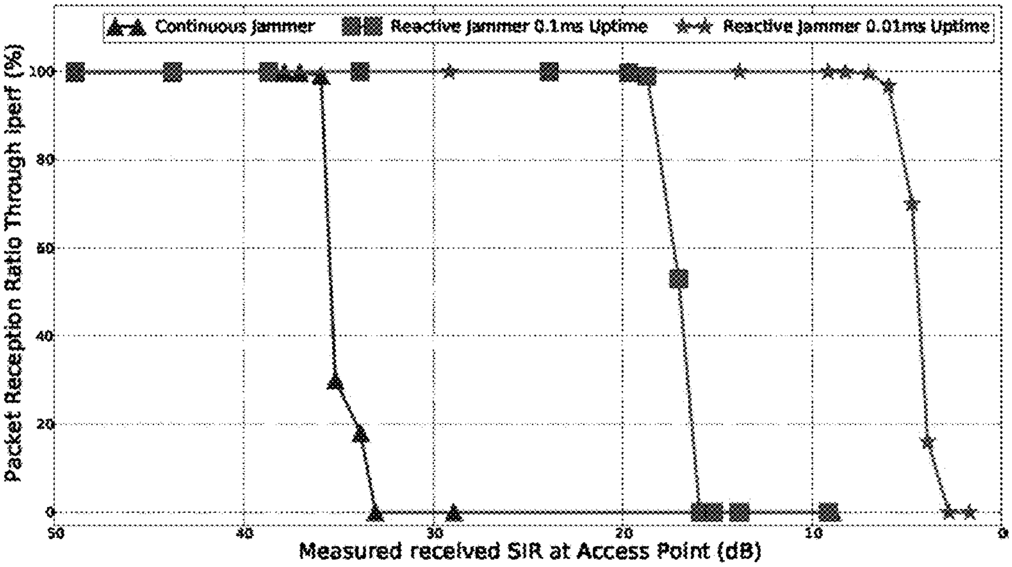
FIG. 11 illustrates the packet reception ratios (PRR) reported by iperf under various jamming conditions where jamming power increases from left to right.

FIG. 11 shows the packet reception ratios (PRR), e.g. the reliability of the link, under various jamming conditions. Link drop-out is achieved with a continuous jammer when the PRR drops from 100% to 0% at around 33 dB SIR (very low jamming power). It is noted that although the instantaneous power requirement is low, the continuous jammer must remain on the entire time to shut down the wireless network. The 0.1 ms uptime reactive jammer required 17 dB more instantaneous power to achieve 0% PRR at 16 dB SIR and below. However, these results do not account for the short active time over which the higher power transmission occurred. In this case, the jamming burst only lasted for 0.1 ms. The 0.01 ms uptime reactive jammer was the most discreet but also required the highest instantaneous power, yielding 0% PRR at SIRs below 3 dB.

While the results seem to show that higher instantaneous power is required to perform reactive jamming operations, it is important to note that actual energy requirements are considerably lower. Only a short reactive jamming burst is required to disable the wireless link and to force a reset of the client connection to re-establish communications.

Validation on WIMAX Networks

To demonstrate the reactive jamming platform's ability to reactively jam signals from multiple high-speed wireless standards, the inventors attempted to detect and jam downlink signals from a mobile WiMAX base station. The target communication standard was 802.16e, using OFDMA as the physical layer. The inventors used an Airspan Air4G macro cell base station to continuously broadcast the downlink signals. The base station was set to operate in Time Division Duplexing (TDD) mode and to utilize a 10 MHz bandwidth channel at 2.608 GHz center frequency. In this mode, the hardware sampling rate was set to 11.4 MHz, and the modulation FFT size was set to 1024.

Three different preamble carrier sets were defined, differing in the allocation of subcarriers. Each preamble set has non-zero pilot tones every 3 subcarriers, and 86 guard band subcarriers on each side of the spectrum. Furthermore, each preamble set uses a different 284-value PN sequence to modulate its subcarriers. The preamble carrier set is selected based on the Cell ID and Segment ID value of the base station. In an exemplary embodiment, the inventors set the base station to Cell ID 1 and to Segment ID 0. In the time domain, the WiMAX preamble constituted a single OFDMA symbol at the beginning of each frame, lasting for 100.8 μs. Internally, this preamble contained an orthogonal code of 284 samples that repeated itself 3 times within the preamble time. The total duration of this code was 25 μs.

Figure 12:
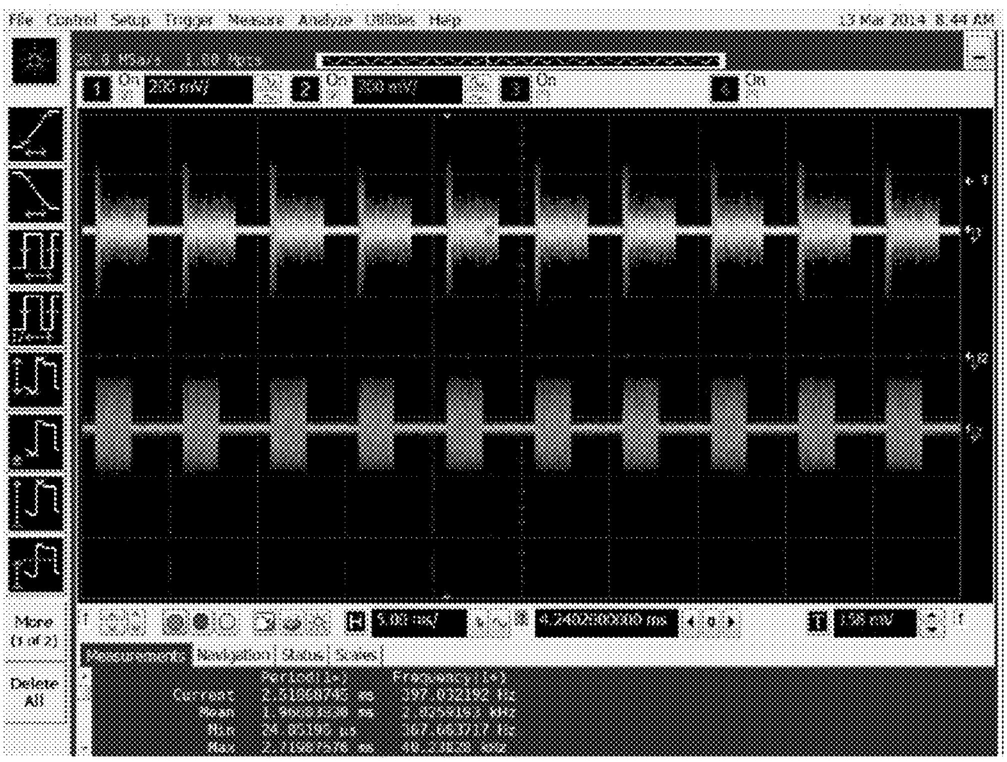
FIG. 12 illustrates reactive jamming of WiMAX downlink packets from an Airspan Air4G base station.

Lacking a functional WiMAX receiver to establish a full TCP/IP stack for running system throughput tests with the base station, the inventors only evaluated reactive jamming performance at the physical layer by observing WiMAX and jamming signals on an oscilloscope. The results presented herein show an informative proof, rather than a thorough measurement analysis. FIG. 12 shows a scope capture of both the WiMAX base station signal and the reactive jamming signal of the invention in the time domain. In the correlation scheme, the inventors attempted to detect the WiMAX preamble using the 64-sample cross-correlator 12, running at 25 MSPS. Again, the 25 μs orthogonal code in the preamble was being correlated across its first 2.56 μs. Insufficient correlation time led to a mis-detection rate of about ⅔ of the packets. However, when combining the cross-correlator with the energy differentiator for detection, the system was able to detect reliably 100% of all downlink packets from only the mobile WiMAX network being observed.

The lower portion of FIG. 12 shows the jamming signal in real time with a one-to-one correspondence to the WiMAX downlink frames. With the energy differentiator 14 alone, the system can simply detect wireless activities without the ability to pinpoint the underlying wireless technology. Having both effective detection and protocol awareness can enable a wide range of sophisticated attacks, such as a type of "surgical jamming" mentioned above, as well as malicious wireless packet injection to interfere with ongoing communications.

CONCLUSION

An implementation of a real-time, protocol-aware, reactive jammer targeted for high-speed wireless networks with preambles has been described. Based on the popular SDR platform USRP N210, the jammer is highly versatile and adapts quickly to intercept 802.11 and 802.16e network traffic under various channel conditions.

The experimental results show that effective reactive jamming in high-speed wireless networks is indeed feasible for an adversary. The results show that the disclosed platform can reliably detect and react to a range of wireless standards. The jamming platform is extremely flexible and programmable to adapt quickly on the fly. This tool sets an example to prove that SDR-based reactive jamming is practical and should be considered a serious physical layer security threat that warrants additional research and consideration in standards development. The test bed described herein may be used as a research instrument for evaluating jamming of wireless networks. For example, the jamming platform described herein may evaluate directional reactive jamming with leaky-wave antennas where the USRP N210 is used with a custom FPGA image. A leaky-wave antenna with, e.g., 7 direction modes, would be controlled from Dbug GPIO using a custom control and biasing PC board. Mode selection would be implemented in hardware. As another example, the platform described herein may be used for FPGA-based direction tracking and reactive response based on a customizable matched filter detector, signal power estimation, time averaging of received parameters, and an exhaustive search conducted in less than 50 msec. Automatic switching to the optimal mode would provide a reactive response. The platform described herein may also be used as an effective tool for studying and developing countermeasures to a new series of real-time over-the-air physical layer attacks.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A real-time reactive jamming device for jamming signal transmissions in a wireless network, comprising:
- a real-time signal detector that detects an event in received packets in said wireless network;
- a reactive jamming device that sends a triggering signal when said event is detected; and
- a jamming generator responsive to said triggering signal to generate a jamming signal that has a user-defined delay so as to enable jamming of specific portions of received packets in the wireless network.

2. A jamming device as in claim 1, wherein said real-time signal detector comprises a hardware cross-correlator that enables run-time loading of user-defined cross-correlation coefficients from host applications that receive said packets in said wireless network.

3. A jamming device as in claim 1, wherein said real-time signal detector comprises an energy differentiator that provides detection triggers based on a difference in received signal energy levels over a predetermined time interval.

4. A jamming device as in claim 3, wherein the difference in received signal energy levels to be detected is user modifiable at run-time.

5. A jamming device as in claim 4, wherein said user modifiable signal energy levels difference is set for an energy change of 3 dB to 30 dB for positive (increasing) and/or negative (decreasing) energy changes.

6. A jamming device as in claim 1, wherein said reactive jamming device comprises a three-stage hardware state machine that performs RF trigger filtering and provides an RF response based on a series of conditional parameters that are changeable in response to RF detection triggers or in response to a control algorithm.

7. A jamming device as in claim 6, wherein said jamming generator, once triggered, generates at least one of three user-selectable jamming waveforms: (i) a wideband noise jammer White Gaussian Noise (WGN) signal, (ii) a receiver replay system that provides repetitive replay of a predetermined number of most recently received samples, or (iii) a transmitter of a user-defined waveform currently being streamed from a host application.

8. A jamming device as in claim 1, wherein a duration of generation of said jamming signal is customizable and ranges from 1 sample time up to at least $2^{32}$ sample times.

9. A jamming device as in claim 1, wherein the triggering signal is an RF signal.

10. A jamming device as in claim 1, wherein the jamming generator generates a jamming signal in approximately 80 ns from the receipt of the triggering signal.

11. A method of jamming signal transmissions in a wireless network, comprising the steps of:
- detecting an event in received packets in said wireless network;
- sending a triggering signal when said event is detected; and
- in response to said triggering signal, generating a jamming signal that has a user-defined delay so as to enable jamming of specific portions of received packets in the wireless network.

12. A method as in claim 11, wherein said detecting step comprises run-time loading of user-defined cross-correlation coefficients from host applications that receive said packets in said wireless network.

13. A method as in claim 11, wherein said detecting step comprises providing detection triggers based on a difference in received signal energy levels over a predetermined time interval.

14. A method as in claim 13, further comprising the step of enabling a user to modify at run-time the difference in received signal energy levels to be detected.

15. A method as in claim 14, wherein said enabling step comprises enabling the user to set the difference in received signal energy levels for an energy change of 3 dB to 30 dB for positive (increasing) and/or negative (decreasing) energy changes.

16. A method as in claim 11, wherein sending the triggering signal comprises performing RF trigger filtering and providing an RF response based on a series of conditional parameters that are changeable in response to RF detection triggers or in response to a control algorithm.

17. A method as in claim 16, wherein generating the jamming signal comprises generating at least one of three user-selectable jamming waveforms: (i) a wideband noise jammer White Gaussian Noise (WGN) signal, (ii) a receiver replay system that provides repetitive replay of a predetermined number of most recently received samples, or (iii) a transmitter of a user-defined waveform currently being streamed from a host application.

18. A method as in claim 11, wherein generating the jamming signal further comprises enabling a user to generate the jamming signal for a customizable duration of time ranging from 1 sample time up to at least $2^{32}$ sample times.

19. A method as in claim 11, wherein the triggering signal sent in the step of sending the triggering signal is an RF signal.

20. A method as in claim 11, wherein the jamming signal is generated in said generating step in approximately 80 ns from receipt of the triggering signal.

* * * * *